(12) United States Patent
Fagan

(10) Patent No.: US 8,360,252 B1
(45) Date of Patent: Jan. 29, 2013

(54) DIRT BIKE STAND AND METHOD OF USE THEREOF

(76) Inventor: Kelly Neil Fagan, Stillwater, OK (US)

( * ) Notice: Subject to any disclaimer, the term of this patent is extended or adjusted under 35 U.S.C. 154(b) by 267 days.

(21) Appl. No.: 12/841,612

(22) Filed: Jul. 22, 2010

(51) Int. Cl.
*A47F 7/00* (2006.01)

(52) U.S. Cl. .......................................................... 211/21

(58) Field of Classification Search .............. 211/17–24, 211/175, 189, 195, 13.1, 207, 208; 248/346.01, 248/346.03, 136, 291.1; 108/99, 96; 254/131, 254/133 R, 2 R, 8 B
See application file for complete search history.

(56) References Cited

U.S. PATENT DOCUMENTS

| | | | | |
|---|---|---|---|---|
| 590,443 | A * | 9/1897 | Temple | 211/21 |
| 592,086 | A * | 10/1897 | Frambes | 211/21 |
| 619,775 | A * | 2/1899 | Murray | 211/21 |
| 620,863 | A * | 3/1899 | Wilcox | 211/21 |
| 4,123,038 | A * | 10/1978 | Meyers | 254/2 R |
| 4,420,164 | A | 12/1983 | Mitchell | |
| 4,541,650 | A | 9/1985 | Cline | |
| 4,993,686 | A * | 2/1991 | Diaz | 254/133 R |
| 5,088,420 | A * | 2/1992 | Russell | 108/106 |
| 5,295,648 | A * | 3/1994 | Hames | 248/149 |
| 5,518,224 | A | 5/1996 | Anderson | |
| 5,660,637 | A * | 8/1997 | Dodge | 118/500 |
| 5,735,410 | A | 4/1998 | Kallstrom | |
| 5,749,475 | A * | 5/1998 | Krebs | 211/24 |
| 5,927,689 | A | 7/1999 | Johnson | |
| 5,979,878 | A * | 11/1999 | Blankenship | 254/131 |
| 5,988,402 | A | 11/1999 | Mayfield | |
| 6,050,546 | A * | 4/2000 | Peschmann et al. | 254/10 B |
| 6,089,544 | A * | 7/2000 | Ellis | 254/1 |
| 6,102,369 | A * | 8/2000 | Monger | 254/8 R |
| 6,241,104 | B1 | 6/2001 | Kraus | |
| 6,241,227 | B1 * | 6/2001 | Berdan et al. | 269/17 |
| 6,341,763 | B1 | 1/2002 | Lefebvre | |
| 6,464,207 | B2 | 10/2002 | Creel et al. | |
| 6,488,157 | B2 * | 12/2002 | Chen | 211/20 |
| 6,502,797 | B1 | 1/2003 | Szczepski | |
| 6,581,785 | B1 * | 6/2003 | Falkenstein | 211/24 |
| 6,619,620 | B1 * | 9/2003 | Carter | 254/10 C |
| 6,640,979 | B1 | 11/2003 | Mayfield | |
| 6,742,798 | B2 | 6/2004 | Berkmann | |
| 6,769,668 | B2 * | 8/2004 | Siglock | 254/124 |
| 6,802,493 | B2 | 10/2004 | Lance | |
| 6,981,694 | B2 | 1/2006 | Carnahan | |
| 7,021,461 | B1 * | 4/2006 | Robey | 206/335 |
| 7,204,475 | B1 | 4/2007 | Burry et al. | |
| 7,296,787 | B2 * | 11/2007 | Barrios et al. | 269/17 |
| 7,686,549 | B1 * | 3/2010 | Posey | 410/3 |
| 7,891,504 | B2 * | 2/2011 | DeMent | 211/59.4 |
| D640,440 | S * | 6/2011 | Thurm | D34/28 |
| 8,020,835 | B2 * | 9/2011 | Bulow et al. | 254/131 |
| 8,104,588 | B2 * | 1/2012 | Curlee et al. | 188/32 |
| 2005/0161574 | A1 | 7/2005 | Andersen | |
| 2005/0199561 | A1 | 9/2005 | Dansie et al. | |

(Continued)

*Primary Examiner* — Jennifer E. Novosad
(74) *Attorney, Agent, or Firm* — Head, Johnson & Kachigian, PC

(57) ABSTRACT

A ride on/ride off dirt bike stand for use with dirt bikes that do not come with a kickstand attached to the dirt bike for parking the dirt bike when not in use, such as motocross, rally, trials and/or track bikes. The dirt bike stand is free standing and includes an upper frame pivotally connected to a base frame, such that the upper frame may be pivoted and secured between an upright position and a lowered position. The upper frame may be height adjustable so that the dirt bike stand may be utilized with different dirt bikes having differing chassis heights. Also, the upper frame may include a rotatable platform to provide a greater surface area for supporting the dirt bike.

20 Claims, 5 Drawing Sheets

U.S. PATENT DOCUMENTS

| | | |
|---|---|---|
| 2006/0191858 A1* | 8/2006 | Posner .......................... 211/20 |
| 2007/0068881 A1 | 3/2007 | Caponette |
| 2008/0023415 A1 | 1/2008 | Zuckerman |
| 2008/0100030 A1 | 5/2008 | Brakhage et al. |
| 2009/0127522 A1 | 5/2009 | Sisson |
| 2011/0220594 A1* | 9/2011 | Chuang .......................... 211/22 |

* cited by examiner

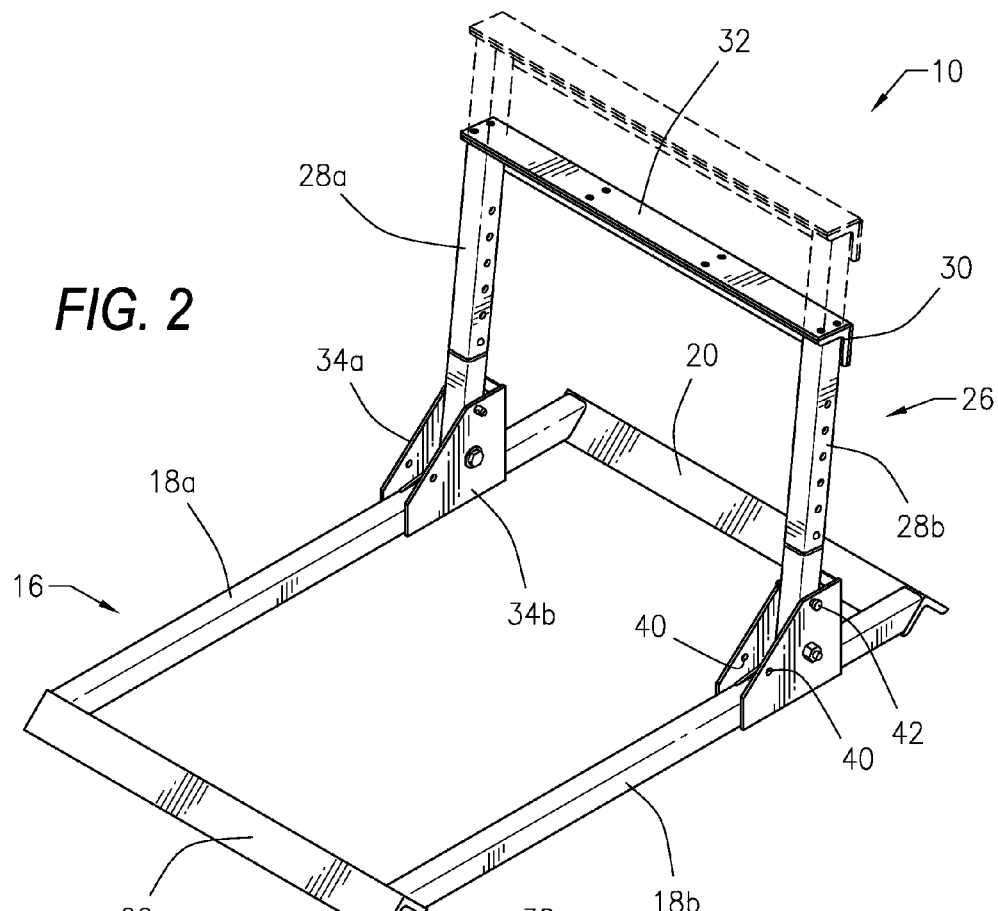

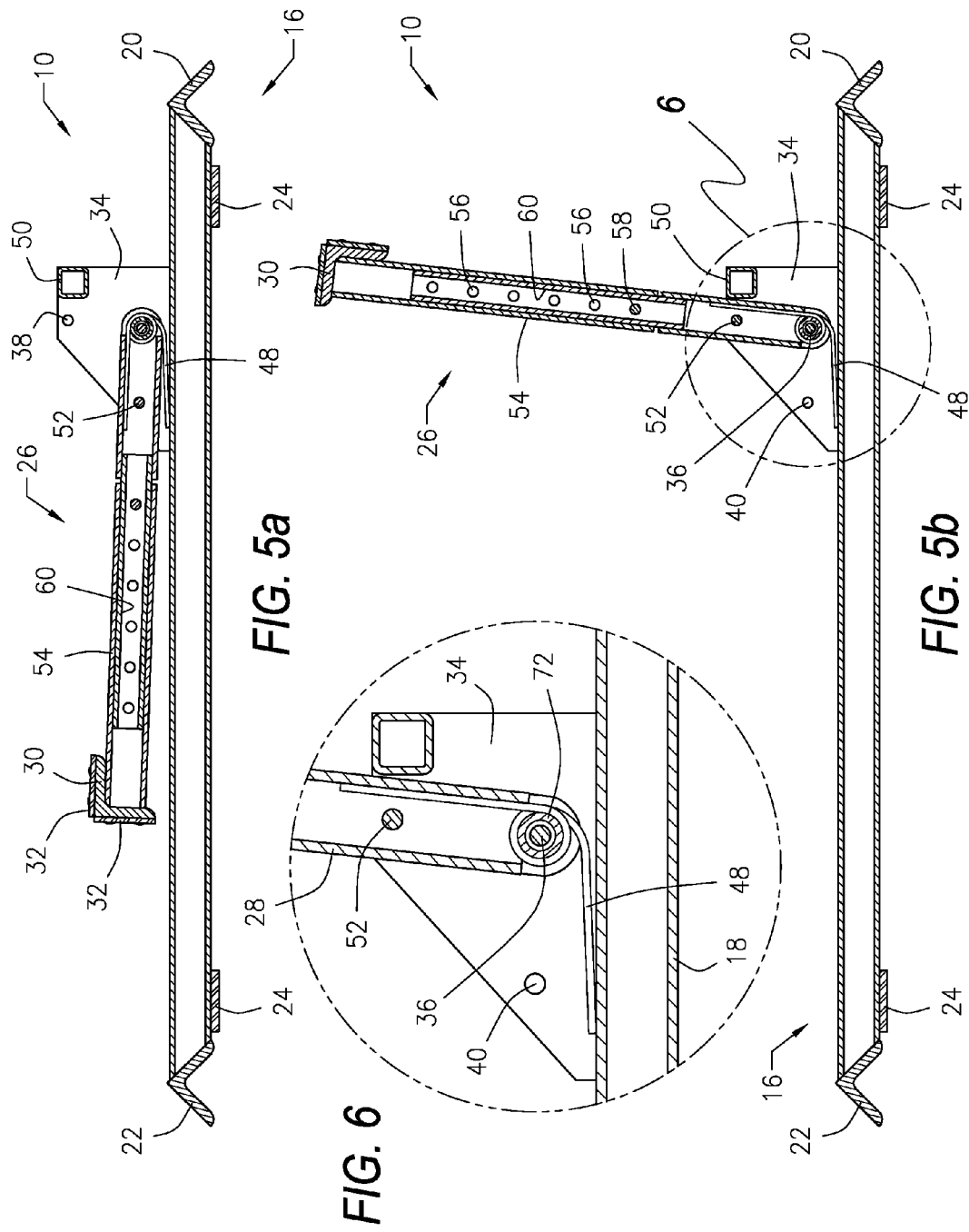

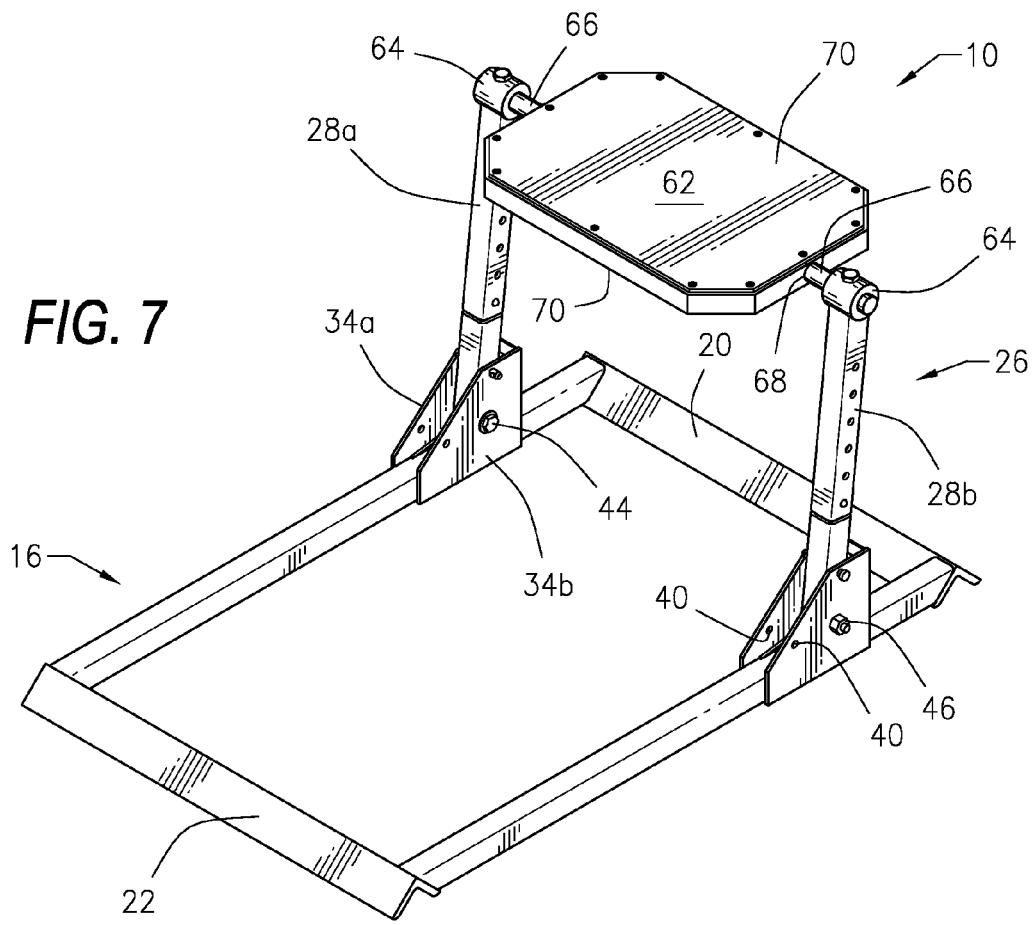

DIRT BIKE STAND AND METHOD OF USE THEREOF

BACKGROUND OF THE INVENTION

1. Field of the Invention

This invention relates generally to a dirt bike stand and method of use thereof, and more particularly to a ride on/ride off dirt bike stand for use with dirt bikes that do not come with a kickstand attached to the dirt bike for parking the dirt bike when not in use, such as motocross, rally, trials and/or track bikes.

2. Description of the Related Art

Dirt bikes and other types of off-road motorcycles need to be periodically examined for maintenance and service purposes. Unlike automobiles, much of the maintenance of a dirt bike is carried out in the owner's garage. The maintenance procedure may include thoroughly checking all of the different components of the dirt bike, and as such, may require parts to be adjusted or even replaced. However, the inaccessibility of the underside to the dirt bike due to its close proximity to the floor makes it difficult to maintain and service the dirt bike when it is inoperable or when the engine is turned off.

During service and maintenance procedures, the only way to access the underside of the chassis, such as for oil changes, is to either lay the dirt bike on its side or to kneel or lie down in an awkward and/or uncomfortable position next to the dirt bike. Since dirt bikes do not come with a kickstand attached to the underside of the chassis, the dirt bike must be manually lifted onto a stand or to slide a stand under the dirt bike. Many different types of stands have been invented to try to keep dirt bikes or other off-road motorcycles in an upright position while simultaneously raising it off the ground. For example, numerous prior art stands have been disclosed which elevate dirt bikes off the floor to a level that is more convenient for accessing the underside of the chassis. The lifts include milk crate type-stands or lift-type stands, such as scissor-type jacks which are mechanically, hydraulically or electrically actuated.

It is therefore desirable to provide a dirt bike stand having full ride on and ride off capabilities.

It is further desirable to provide a dirt bike stand that supports a dirt bike or other off-road motorcycle that does not have a kickstand attached for access to the underside of the chassis.

It is still further desirable to provide a ride on/ride off dirt bike stand that is constructed to support dirt bikes in a stable and elevated position so that the chassis can be accessed for maintenance and service procedures.

It is yet further desirable to provide a ride on/ride off dirt bike stand that may be easily stowed and moved to different locations and that is economical to manufacture.

It is yet further desirable to provide a ride on/ride off dirt bike stand that is free standing, and not attached to the dirt bike, such that a person can ride onto and park the dirt bike, and when the person is ready to ride again, he/she can simply climb back on the dirt bike while it is still on the stand, start the dirt bike, and ride the dirt bike off the dirt bike stand.

It is yet further desirable to provide a dirt bike stand that allows a tired younger or older rider to not to have to manually lift their dirt bike onto a stand or fight with a lift stand after a hard ride or race.

It is yet further desirable to provide a ride on/ride off dirt bike stand that can be locked in a lowered position to create a low profile design for storage and transfer to and from the track or trail riding locations.

It is yet further desirable to provide a dirt bike stand that can be locked in an upright position for working on the dirt bike either in the field or shop and storage of the dirt bike in the shop.

It is yet further desirable to provide a dirt bike stand having height adjustment capabilities so that a person can use the dirt bike stand on different sized dirt bikes, such as when a child rider grows older and changes dirt bikes, without having to buy a new dirt bike stand for each size change.

SUMMARY OF THE INVENTION

In general, the invention relates to a ride on/ride off dirt bike stand for use with a dirt bike that does not have a kickstand attached to the dirt bike. The dirt bike has a chassis, and the dirt bike stand includes an upper frame pivotally connected to a base frame. The base frame is adapted to be placed directly on a generally flat horizontal support surface. Also, the base frame includes a pair of spaced base members, a front ramp and a rear ramp. The base members are substantially longitudinally parallel, and the front ramp and the rear ramp are secured intermediate of and perpendicular to the base members. The rear ramp is substantially longitudinally parallel to the front ramp, and the base frame may be substantially rectangular in shape. The front ramp and the rear ramp may each have a generally inverted-V shape. Further, the front ramp and the rear ramp may each include two legs adapted to be placed directly on the support surface and an apex positioned towards the chassis of the dirt bike.

The upper frame of the dirt bike stand, which is pivotally secured to the base frame intermediate of the front ramp and the rear ramp, is capable of being pivoted between an upright position and a lowered position, with the upper frame being biased toward the upright position. The upper frame includes a pair of spaced arm members and a support arm. The arm members are substantially longitudinally parallel, and the support arm is secured substantially perpendicular to each of the arm members. A lower section of each of the arm members is pivotally secured to the base frame.

The dirt bike stand may also include a pair of substantially vertical support plates rigidly attached to opposing sides of each of the base members. Each of the support plates can have a pivot aperture, an upright lock aperture and a lowered lock aperture. The pivot apertures of the support plates are coaxially aligned and axially spaced. The upright lock apertures of the support plates are coaxially aligned and axially spaced, and the lowered lock apertures of the support plates are also coaxially aligned and axially spaced. A stop block may be rigidly secured intermediate of the support plates of each of the pairs of substantially vertical support plates, while a plurality of rubber pads attached to a bottom of the base frame.

The lower section of each of the arm members of the upper frame has a pivot aperture and a locking aperture. The pivot apertures of the arm members are coaxially aligned with the pivot apertures of the support plates. The locking apertures of the arm members are coaxially aligned with the upright lock apertures of the support plates when the upper frame is in the upright position, while the locking apertures of the arm members are coaxially aligned with the lowered lock apertures of the support plates when the upper frame is in the lowered position.

Each of the arm members can also include an inner arm and an outer arm, with the inner arm being slidably engaged within the outer arm. The inner arm is coaxially and longitudinally aligned with the outer arm. Further, the inner arm may have an outer dimension less than an inner dimension of the outer arm such that the inner arm telescopes into and out of the outer arm. Moreover, the inner arm and the outer arm can each have a series of longitudinally aligned apertures through which a depressible detent protrudes.

The support arm of the dirt bike stand can be a generally L-shape or an axle with a platform rotatably connected to each of the arm members. The platform has opposing planar faces. The support arm is covered with a protective coating.

Further, the dirt bike stand may include a spring being secured between the upper frame and the base frame for biasing the upper frame in the upright position. The spring may have opposing legs, with one leg inserted into an interior of a bottom section of each of the arm member, respectively, of the upper frame, and the other leg of the spring positioned against a top surface of the base member of the base frame. A center coil of the spring is coaxially aligned with the pivot aperture. In addition, the dirt bike stand can include a locking pin capable of being inserted through either upright locking apertures or lowered locking apertures of the support plates of the base frame and locking apertures of the arm members of the upper frame to lock the dirt bike stand in the upright position or in the lowered position.

BRIEF DESCRIPTION OF THE DRAWINGS

FIG. 2 is a perspective view of an example of a dirt bike stand in an upright position in accordance with an illustrative embodiment of the dirt bike stand disclosed herein;

FIG. 3 is a perspective view of the dirt bike stand shown in FIG. 2 in a lowered position;

FIG. 5a is a cross-section view along line 5-5 of the dirt bike stand shown in FIG. 4, with the dirt bike stand in a lowered position;

FIG. 5b is a cross-section view along line 5-5 of the dirt bike stand shown in FIG. 4, with the dirt bike stand in an upright position;

FIG. 6 is an exploded view of area 6 of the dirt bike stand shown in FIG. 5b;

FIG. 7 is a perspective view of another example of a dirt bike stand in an upright position in accordance with an illustrative embodiment of the dirt bike stand disclosed herein; and FIG. 8 is a perspective view of the dirt bike stand shown in FIG. 7 in a lowered position.

Other advantages and features will be apparent from the following description and from the claims.

DETAILED DESCRIPTION OF THE INVENTION

The dirt bike stands discussed herein are merely illustrative of specific manners in which to make and use the dirt bike stands and are not to be interpreted as limiting in scope.

While the dirt bike stands have been described with a certain degree of particularity, it is to be noted that many modifications may be made in the construction and the arrangement of the structural and function details disclosed herein without departing from the spirit and scope of this disclosure. It is understood that the dirt bike stands are not limited to the embodiments set forth herein for purposes of exemplification.

Figure 1:
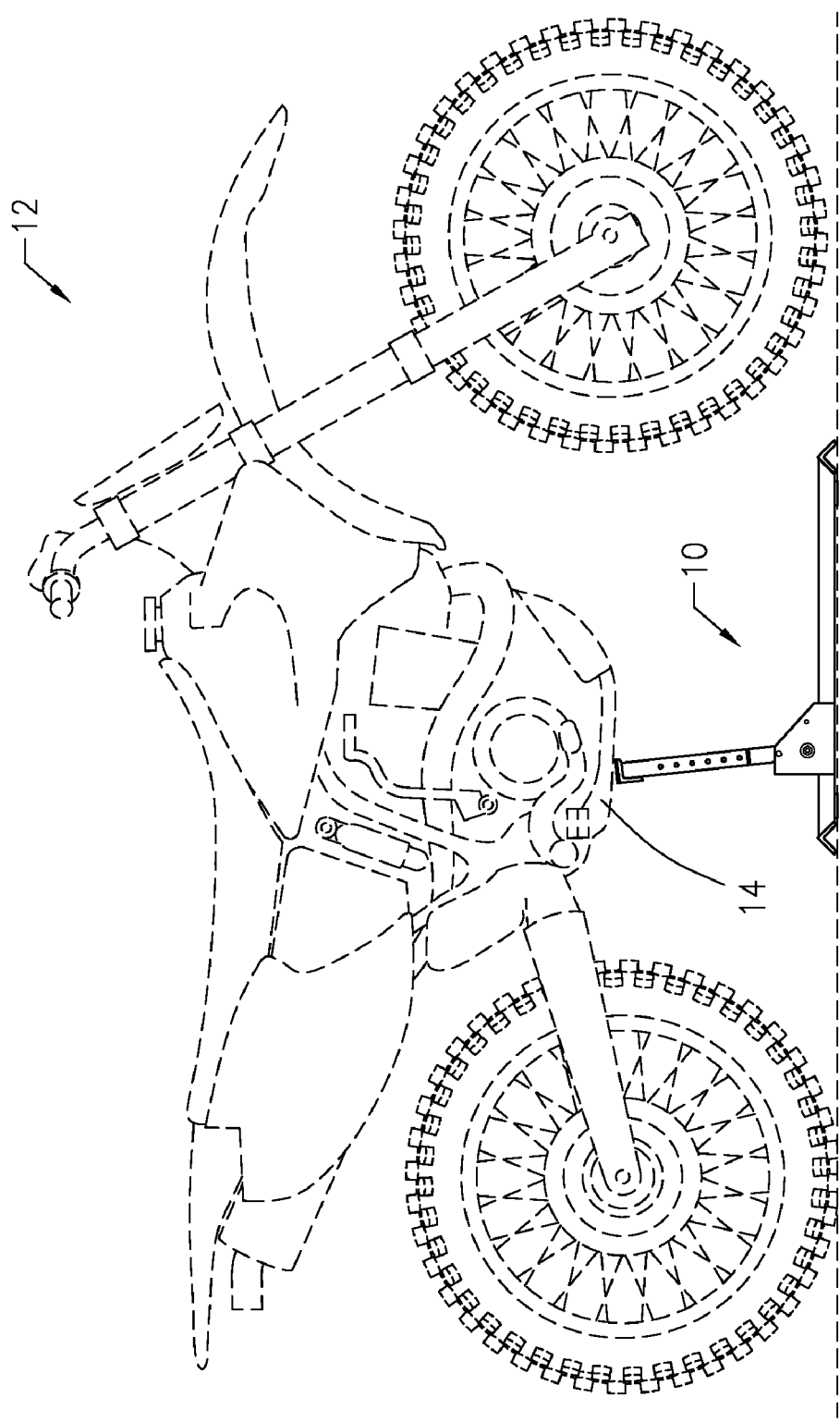
FIG. 1 is a side view of an example of a dirt bike stand shown in use with a dirt bike in accordance with an illustrative embodiment of the dirt bike stand disclosed herein.
Figure 4:
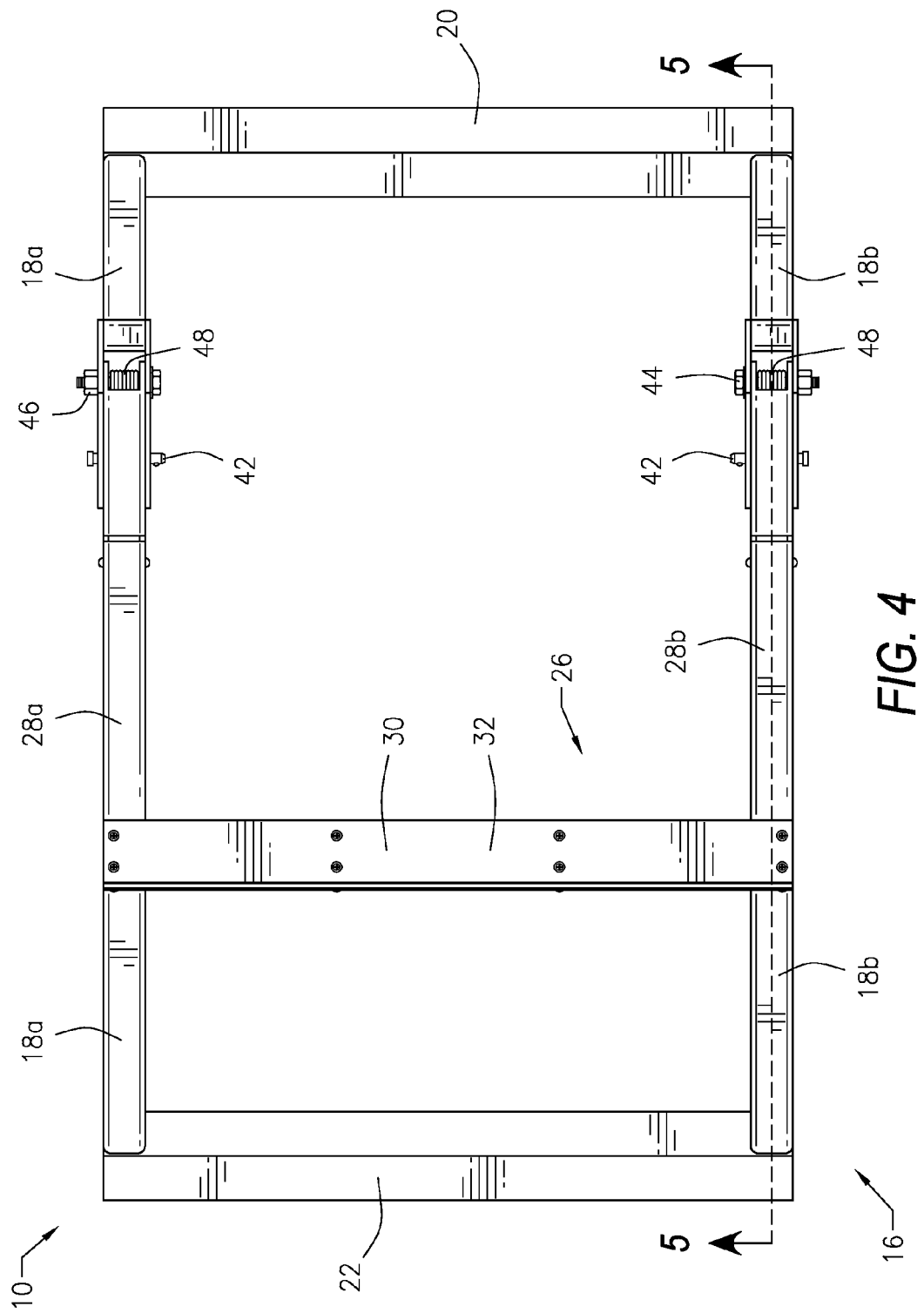
FIG. 4 is a top view of the dirt bike stand shown in FIG. 2.

Referring to the figures of the drawings, wherein like numerals of reference designate like elements throughout the several views, and initially to FIG. 1, a dirt bike stand 10 onto which a dirt bike 12 or similar type of off-road motorcycle is shown supported thereon in phantom. The dirt bike stand 10 is intended for cooperation with the chassis 14 of dirt bikes that do not come with a kickstand attached for parking the dirt bike 12 when not in use, such as motocross, rally, trials and/or track bikes. The dirt bike stand 10 is one-directional and free standing, such that a person (not shown) can ride onto to park the dirt bike 12. While stationary and supported in an upright position by the dirt bike stand 10, the person may perform various service and/or maintenance procedures to the dirt bike 12. When the person is ready to ride the dirt bike 12 again, he/she just climbs back on the dirt bike 12 while it is still on the dirt bike stand 10, starts the engine of the dirt bike 12, puts the dirt bike 12 in gear and rides the dirt bike 12 off the dirt bike stand 10. The dirt bike stand 10 may be constructed from a variety of materials, such as steel, aluminum or other sturdy material designed to sustain a load such as weight of the dirt bike 12.

Referring now to FIGS. 2 through 6, the dirt bike stand 10 has a substantially horizontal, rectangular shaped base frame 16 which is intended to be placed directly on a generally flat horizontal support surface, such as a floor or the ground. The base 16 includes a pair of spaced, substantially longitudinally parallel base members 18a and 18b. A front ramp 20 and a rear ramp 22 are respectively attached to terminal ends of the base members 18a and 18b. The front ramp 20 and/or the rear ramp 22 may have a generally inverted-V shape, such that the two (2) legs are placed directly on the support surface, while the apex is positioned towards the chassis 14 of the dirt bike 12. The base frame 16 may include rubber pads 24 on a bottom side for use on concrete.

An upper frame 26 is pivotally secured to the base frame 16, such as intermediate of the front ramp 20 and the rear ramp 22 and intermediate of a pair of substantially vertical support plates 34a and 34b. The upper frame 26 may have a generally inverted U-shape and include a pair of spaced, substantially longitudinally parallel arm members 28a and 28b. Terminal ends of the arm members 28a and 28b are pivotally secured to the base members 18a and 18b of the base frame 16, respectively. The support plates 34a and 34b are firmly attached to opposing sides of the base members 18a and 18b, and the arm members 28a and 28b pivotally traverse in between the support plates 34a and 34b. The other terminal ends of the arm members 28a and 28b are joined via a substantially horizontal support member 30. As illustrated, the support member 30 may be generally L-shaped and may be coated with a protector 32, such as a rubber coating, to protect the chassis 14 of the dirt bike 12. The support member 30 is substantially perpendicular to both of the arm members 28a and 28b.

The base members 18a and 18b are hereinafter collectively referred to as base members 18, the arm members 28a and 28b are hereinafter collectively referred to as arm members 28, and the support plates 34a and 34b are hereinafter collectively referred to as support plates 34. Turning to FIGS. 5 and 6, the arm members 28 of the upper frame 26 are pivotally secured to the base members 18 of the base frame 16 in between the support plates 34. The arm members 28 include a locking aperture 52, which is aligned with at least one set of apertures in the support plates 34. The apertures in the support plates 34 can include three (3) separate sets of axially spaced and coaxially aligned apertures: one set of pivot apertures 36 serving as the pivot point between the upper frame 26 and the base frame 16, one set of upright pin apertures 38 to allow the dirt bike stand 10 to be locked in an upright position for maintenance and/or servicing of the dirt bike 12, and one set of lowered pin apertures 40 to allow the dirt bike stand 10 to be locked in an lowered position for storage and transport of the dirt bike stand 10. A locking pin 42 may be inserted through the upright pin apertures 38 of the support plates 34 and the locking apertures 52 of the arm members 28, as illustrated in FIGS. 2 and 5b, to lock the dirt bike stand 10 in the upright position, or may be inserted through the lowered pin apertures 40 of the support plates 34 and the locking apertures 52 of the arm members 28, as illustrated in FIG. 3, 5b, to lock the dirt bike stand 10 in the lowered position. A bolt 44 may be inserted through the pivot apertures 36 and secured using a nut 46 to form the pivot point between the base frame 16 and the upper frame 26.

The upper frame 26 is biased toward the upright position using at least one spring 48. Each of the springs 48 may having opposing legs, with one leg inserted into an interior of a bottom portion of the arm members 28 and the other leg positioned against a top surface of the base members 16, as illustrated in FIGS. 5a, 5b and 6. The center helical coil of the spring 48 is coaxially aligned with and may include a brass bushing 72 about the bolt 44. The spring 48 biases the arm members 28 of the upper frame 26 toward the upright position. A stop block 50 may be secured intermediate of the support plate 34 to form a stop for the arm members 28 when they pivot to a fully upright position, which as illustrated can be past vertical. Thus, when the dirt bike stand 10 is in the upright position, the upper frame 26 is generally perpendicular to the base frame 16.

As can be seen from FIGS. 5a and 5b, each of the arm members 28 of the upper frame 26 can be made to be adjustable for different sized dirt bikes. In particularly and as exemplified, but not by way of limitation, the arm members 28 may include an inner arm 60 slidably engaged within and coaxially aligned with an outer arm 54. The inner arm 60 and the outer arm 54 may each include a series of longitudinally aligned apertures 56 through which a depressible detent 58 protrudes. The depressible detent 58 may be spring loaded or substantially V-shaped depressible detent. The inner arm 60 has an outer diameter (or similar dimension) less than an inner diameter (or similar dimension) of the outer arm 54, such that the inner arm 60 slides along the interior of the outer arm 54. In order to raise or lower the height of the support member 30 in relation to the chassis 14 of the dirt bike 12, the person would depress the detents 58 allowing the outer arm 54 to slide either up or down longitudinally along the inner arm 60. When a desired height is reached, the person allows the detents 58 to protrude through the appropriate apertures 56, thereby locking the height of the upper frame 26.

Referring now to FIGS. 7 and 8, the support member 30 of the upper frame 26 of the dirt bike stand 10 may alternatively be a platform 62 rotatably connected to the arm members 28. As illustrated, the upper terminal ends of the arm members 28 may each include a cylindrical joint 64 into which opposing ends of an axle 66 is rotatably secured. The platform 62 may have a sufficient width such that the axle 66 passes through a center axial channel 68, enabling the platform 62 to having opposing usable faces 70. In this example, the platform 62 makes flush and solid contact with the chassis 14 of the dirt bike 12 during usage. Similarly to the support member 30, the platform 62 may be covered with a protective layer of material to protect the chassis 14 of the dirt bike 12 during usage.

Pursuant to the method of using the dirt bike stand 10, such as for maintenance, service or storage of the dirt bike 12, the person riding their dirt bike 12 onto the dirt bike stand 10 roll the front tire of the dirt bike 12 onto and over the front ramp 20, thereby making contact with the upper frame 26. As the rider continues to roll the front tire of the dirt bike 12 forward, the upper frame 26 pivots from the upright position to the lowered position, and once the front tire clears the support member 30 (or the platform 62) of the dirt bike stand 10, the upper frame 26 springs back from the lowered position making contact with the chassis 14 of the dirt bike 12. The rider can then get off the dirt bike 12 and pulls the dirt bike 12 backwards to set the dirt bike stand 10 in the upright position, as illustrated in FIG. 1. While on the dirt bike stand 10, a number of maintenance or other service procedures may be conducted. When the person is ready to ride the dirt bike 12 again, the rider would climb back on the dirt bike 12 while it is still on the dirt bike stand 10. The rider simply starts the engine of the dirt bike 12, puts it in gear, and rides the dirt bike 12 off the dirt bike stand 10.

Whereas, the dirt bike stands have been described in relation to the drawings and claims, it should be understood that other and further modifications, apart from those shown or suggested herein, may be made within the spirit and scope of the dirt bike stands.

What is claimed is:

1. A dirt bike stand for use with a dirt bike that does not have a kickstand attached to the dirt bike, said dirt bike having a chassis, said dirt bike stand comprising:

a base frame adapted to be placed directly on a generally flat horizontal support surface; said base frame having a pair of spaced base members, a front ramp, a rear ramp and at least one support plate; said base members being substantially longitudinally parallel; said front ramp secured intermediate of said base members; said front ramp being substantially perpendicular to each of said base members; said rear ramp secured intermediate of said base members; said rear ramp being substantially perpendicular to each of said base members; said rear ramp being substantially longitudinally parallel to said front ramp; and said support plate having a pivot aperture, an upright lock aperture and a lowered lock aperture;

an upper frame pivotally secured to said base frame intermediate of said front ramp and said rear ramp; said upper frame capable of being pivoted between an upright position and a lowered position; said upper frame being biased toward said upright position; said upper frame further comprising a pair of spaced arm members and a support arm; said arm members being substantially longitudinally parallel; a lower section of each of said arm members pivotally secured to said base frame; said lower section of at least one of said arm members comprising a pivot aperture and a locking aperture; said pivot aperture of said arm member being coaxially aligned with said pivot aperture of said support plate; said locking aperture of said arm member being coaxially aligned with said upright lock aperture of said support plate when said upper frame is in said upright position; said locking aperture of said arm member being coaxially aligned with said lowered lock aperture of said support plate when said upper frame is in said lowered position; said support arm secured intermediate of said arm members; and said support arm being substantially perpendicular to each of said arm members;

wherein said upper frame is substantially parallel to said base frame when in said lowered position; and wherein said upper frame is generally perpendicular to said base frame when in said upright position.

2. The dirt bike stand of claim 1 wherein said front ramp and said rear ramp each have a generally inverted-V shape.

3. The dirt bike stand of claim 2 wherein said front ramp further comprises two legs adapted to be placed directly on the support surface and an apex positioned towards the chassis of the dirt bike; and wherein said rear ramp further comprises two legs adapted to be placed directly on the support surface and an apex positioned towards the chassis of the dirt bike.

4. The dirt bike stand of claim 1 wherein said support plate further comprises a pair of substantially vertical support plates rigidly attached to opposing sides of each of said base members.

5. The dirt bike of claim 4 wherein each of said support plates comprises a pivot aperture, an upright lock aperture and a lowered lock aperture; said pivot apertures of said support plates being coaxially aligned and axially spaced; said upright lock apertures of said support plates being coaxially aligned and axially spaced; and said lowered lock apertures of said support plates being coaxially aligned and axially spaced.

6. The dirt bike stand of claim 5 wherein said lower section of each of said arm members has a pivot aperture and a locking aperture.

7. The dirt bike stand of claim 6 further comprising said pivot apertures of said arm members being coaxially aligned with said pivot apertures of said support plates; said locking apertures of said arm members being coaxially aligned with said upright lock apertures of said support plates when said upper frame is in said upright position; and said locking apertures of said arm members being coaxially aligned with said lowered lock apertures of said support plates when said upper frame is in said lowered position.

8. The dirt bike stand of claim 4 further comprising a stop block rigidly secured intermediate of said support plates of each of said pairs of substantially vertical support plates.

9. The dirt bike stand of claim 1 further comprising a plurality of rubber pads attached to a bottom of said base frame.

10. The dirt bike stand of claim 1 wherein each of said arm members further comprises an inner arm and an outer arm, and said inner arm being slidably engaged within said outer arm.

11. The dirt bike stand of claim 10 further comprising said inner arm being coaxially longitudinally aligned with said outer arm; and said inner arm having an outer dimension less than an inner dimension of said outer arm such that said inner arm telescopes into and out of said outer arm.

12. The dirt bike stand of claim 10 further comprising said inner arm and said outer arm having a series of longitudinally aligned apertures through which a depressible detent protrudes.

13. The dirt bike stand of claim 1 wherein said support arm has a generally L-shape and is covered with a protective coating.

14. The dirt bike stand of claim 1 wherein said support arm further comprising an axle with a platform rotatably connected to each of said arm members.

15. The dirt bike stand of claim 14 wherein said platform has opposing planar faces, and each of said opposing planar faces of said platform is covered with a protective coating.

16. The dirt bike stand of claim 1 further comprising a spring being secured between said upper frame and said base frame for biasing said upper frame in said upright position.

17. The dirt bike stand of claim 16 wherein said spring has opposing legs, with one leg inserted into an interior of a bottom section of each of said arm member, respectively, of said upper frame, and the other leg of said spring positioned against a top surface of said base member of said base frame, and a center coil of said spring coaxially aligned with a pivot aperture.

18. The dirt bike stand of claim 1 further comprising a locking pin capable of being inserted through either upright locking apertures or lowered locking apertures of said support plates of said base frame and locking apertures of said arm members of said upper frame to lock said dirt bike stand in said upright position or in said lowered position.

19. A ride on/ride off dirt bike stand for use with a dirt bike that does not have a kickstand attached to the dirt bike, said dirt bike having a chassis, said dirt bike stand comprising:
- a base frame adapted to be placed directly on a generally flat horizontal support surface; said base frame being generally rectangular in shape; and said base frame further comprising:
  - a pair of spaced base members; and said base members being substantially longitudinally parallel;
  - a front ramp secured intermediate of said base members;
  - a rear ramp secured intermediate of said base members; said rear ramp being substantially longitudinally parallel to said front ramp; and
  - a pair of substantially vertical support plates rigidly attached to opposing sides of each of said base members; each of said support plates having a pivot aperture, an upright lock aperture and a lowered lock aperture; said pivot apertures of said support plates being coaxially aligned and axially spaced; said upright lock apertures of said support plates being coaxially aligned and axially spaced; and said lowered lock apertures of said support plates being coaxially aligned and axially spaced;
- an upper frame pivotally secured to said base frame intermediate of said front ramp and said rear ramp; said upper frame having a generally inverted-U shape; said upper frame capable of being pivoted between an upright position and a lowered position; said upper frame being biased toward said upright position; and said upper frame further comprising:
  - a pair of spaced arm members; said arm members being substantially longitudinally parallel; a lower section of each of said arm members pivotally secured to said base frame intermediate of said support plates; said lower section of each of said arm members having a pivot aperture and a locking aperture; said pivot apertures of said arm members being coaxially aligned with said pivot apertures of said support plates; said locking apertures of said arm members being coaxially aligned with said upright lock apertures of said support plates when said upper frame is in said upright position; said locking apertures of said arm members being coaxially aligned with said lowered lock apertures of said support plates when said upper frame is in said lowered position; each of said arm members further comprising an inner arm and an outer arm; said inner arm being coaxially longitudinally aligned with said outer arm; and said outer arm being selectively slidable along said inner arm in order to adjust the height of said upper frame; and
  - a support arm secured intermediate of said arm members;
- at least one spring secured between said upper frame and said base frame for biasing said upper frame in said upright position; said spring having opposing legs, with one leg inserted into an interior of a bottom section of each of said arm member, respectively, of said upper frame; and the other leg of said spring positioned against a top surface of said base member of said base frame, a center coil of said spring coaxially aligned with said pivot aperture; and
- a locking pin capable of being inserted through either said upright locking apertures or said lowered locking apertures of said support plates of said base frame and said locking apertures of said arm members of said upper frame to lock said dirt bike stand in said upright position or in said lowered position.

20. The ride on/ride off dirt bike stand of claim 19 said support arm having a generally L-shape or having an axle with a platform rotatably connected to each of said arm members.

* * * * *